US008533781B2

(12) United States Patent
Tie et al.

(10) Patent No.: US 8,533,781 B2
(45) Date of Patent: Sep. 10, 2013

(54) ACCESS METHOD SUITABLE FOR WIRELESS PERSONAL AREA NETWORK

(75) Inventors: Manxia Tie, Xi'an (CN); Jun Cao, Shaanxi (CN); Yuelei Xiao, Shaanxi (CN); Zhenhai Huang, Shaanxi (CN); Xiaolong Lai, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 299 days.

(21) Appl. No.: 13/058,099

(22) PCT Filed: Jul. 28, 2009

(86) PCT No.: PCT/CN2009/072945
§ 371 (c)(1),
(2), (4) Date: Feb. 8, 2011

(87) PCT Pub. No.: WO2010/015174
PCT Pub. Date: Feb. 11, 2010

(65) Prior Publication Data
US 2011/0145890 A1  Jun. 16, 2011

(30) Foreign Application Priority Data
Aug. 8, 2008  (CN) .......................... 2008 1 0150571

(51) Int. Cl.
*G06F 7/04* (2006.01)

(52) U.S. Cl.
USPC ............................................................ 726/3

(58) Field of Classification Search
USPC ................ 340/5.8, 5.85, 5.86; 380/247–250; 705/14, 44; 707/705; 709/225; 710/107–125; 711/147–153; 713/155–159; 726/2, 27, 726/3–21
See application file for complete search history.

(56) References Cited

U.S. PATENT DOCUMENTS

2007/0121947 A1  5/2007  Sood et al.
2007/0190973 A1 *  8/2007  Goto et al. ................... 455/410

FOREIGN PATENT DOCUMENTS

| CN | 101227362 A | 7/2008 |
| CN | 101340344 A | 1/2009 |
| KR | 10-0737544 B1 | 5/2007 |

OTHER PUBLICATIONS

International Search Report of PCT/CN2009/072945 Dated Nov. 5, 2009 With an English Translation.

*Primary Examiner* — Phuoc Nguyen
*Assistant Examiner* — Davoud Zand
(74) *Attorney, Agent, or Firm* — Venable LLP; Robert Kinberg

(57) ABSTRACT

The embodiments of the invention disclose an access method suitable for wireless personal area network (WPAN). After the coordinator broadcasts the beacon frame, according to the beacon frame, the equipment identifies the authentication demand and the authentication mode required by the coordinator to the equipment. If the coordinator has no authentication demand to the equipment, the equipment and the coordinator carry out the association processes directly; otherwise, based on a selected authentication mode and the corresponding authentication mechanism negotiation information, the equipment sends the authentication access request to the coordinator; then based on the authentication mode selected by the equipment, the coordinator carries out the processes of authentication and session key negotiation with the equipment; finally, the coordinator sends the authentication access response to the equipment, when the authentication state in the authentication access response is success, the equipment carries out the association processes with the coordinator. The processes of authentication and the session key negotiation can be based on primitive control, and also can be based on port control. If the equipment is associated with the coordinator successfully, the coordinator distributes a network address to the equipment, and therefore the equipment can communicate with the coordinator normally. The invention solves the technical problems of lower security and lower efficiency in the existing WPAN access methods.

17 Claims, 2 Drawing Sheets

ACCESS METHOD SUITABLE FOR WIRELESS PERSONAL AREA NETWORK

CROSS-REFERENCE TO RELATED APPLICATION

The present application is a US National Stage of International Application No. PCT/CN2009/072945, filed on Jul. 28, 2009, designating the United States, and claiming priority to Chinese Patent Application No. 200810150571.8 filed with the State Intellectual Property Office of China on Aug. 8, 2008 and entitled "Access method suitable for wireless personal area network", which is incorporated herein by reference in its entirety.

FIELD OF THE INVENTION

The present invention relates to the field of communications and particularly to an access method applicable in a wireless personal area network.

BACKGROUND OF THE INVENTION

In recent years, wireless mobile communications have developed rapidly and new technologies thereof have emerged constantly from the 3G for cellular communications to the LMDS and the MMDS for a broadband wireless access and further to the WAPI and the IEEE 802.11b, 802.11a and 802.11g for a wireless local area network so that the world has become smaller and smaller throughout such a wireless network. Ubiquitous network terminals, human oriented, personalized and intelligent mobile computing, and emerging concepts and products including a convenient and rapid wireless access, wireless interconnection, etc., have been gradually integrated into daily work and life of people. Various potable consumer electronic products, e.g., a mobile phone, a Personal Digital Assistant (PDA), a notebook computer, a digital camera, etc., have increasingly become a part of people's life. Along with an increasing number of such peripheral devices, it is really bothersome of how to share multiple kinds of devices and information thereof with ease and at a low cost in limited, varying and small office and residence environments. In view of this, the Wireless Personal Area Network (WPAN) is an emerging wireless communication network technology to address such a wireless and seamless connection with a small radius of activity, for diversified types of services and for a specific group of people.

The WPAN is a wireless network running in parallel to but with a smaller coverage range than that of the wireless wide area network and the wireless local area network, currently has become an important part of communication networks and also a predominant technology for 4G wireless communication and control, and also can be connected seamlessly with various air interfaces of 2G and 3G mobile communication. If an access network is considered as "the last mile" toward a digitized era, then the WPAN is "the last 50 meters". The WPAN provides a seamless connection for diversified types of services and for a specific group of people in a Personal Operating Space (POS). The POS is just a small coverage space around a person in a typical range of 10 m where communications takes place in an "Ad Hoc" way. The POS is only defined for a person, particularly for a device held by the person, and moves with a moving user. The POS not only provides devices therein with a communication capability but also allows them to communicate with another device entering the POS. The WPAN may naturally come into being as required for a user without too may intervention from the user and may interoperate with an already deployed network or an independent network. The WPAN may further provide a verified and secured operation mode to allow a rapid connection of an authorized personal device while rejecting a connection of any other unauthorized device. The WPAN primarily targets the personal user market and serves convenient and rapid data transmission between consumer electronic devices so that WPAN devices are advantageous in their low cost, small volume, easy operation, low power consumption, etc.

For an access to the WPAN, a device has to be connected with a coordinator in the WPAN, which refers to an installation enabling an access of the device to the WPAN and providing the device with a routing function while performing some functions of a terminal. There are three general WPAN access methods at present.

In the first access method, the device accesses the WPAN in an unsecured mode and obtains a network address and then communicates with another device in the WPAN or performs secured communication with the other device in the WPAN after obtaining a security service key from the WPAN.

In the second access method, the devices uses a pre-shared session key to perform a security operation on an association process, and if the coordinator can perform a de-security operation successfully, then the coordinator enables an access of the device to the WPAN so that the device accesses the WPAN in a secured mode and obtains a network address.

In the third access method, the device accesses the WPAN in an unsecured mode and obtains a network address and then is authenticated with an administrator of the WPAN, and if authentication is passed, then an access of the device to the WPAN is enabled; otherwise, the device is removed from the WPAN.

The first access method is suitable for those WPANs for which no security or only secured communication is required and typically is an optional access form during deployment of the WPAN. In the second access method, the pre-shared session key is required between the device and the coordinator but is not fresh so that the pre-shared session key is easy to be cracked, thereby resulting in degraded security. In the third access method, each device going to access to the WPAN has to be authenticated with the administrator of the WPAN, thereby resulting in a significant traffic of communication and a consequential low efficiency, and moreover any device may initiate a DoS attack, that is, it accesses the WPAN in an unsecured mode and obtains a network address and then is authenticated with the administrator of the WPAN but ends with a failure of authentication.

In the first and third access methods, the device may obtain a network address and access the WPAN without any mutual authentication with the coordinator. In the second method, a separate authentication process is absent and the security is low although the device and the coordinator can confirm the identities of each other. Consequently, an authentication process has to be performed between the device and the coordinator prior to the association process to thereby ensure a secured access of the device to the WPAN through the coordinator. Typically two authentication modes are available, i.e., direct authentication and authentication based upon an authentication suite. In the former mode, the device transmits specific authentication information, e.g., a hash value of a password, an identifier, etc., to the coordinator, then the coordinator judges for authentication of received authentication information, and finally the coordinator transmits an authenticated status to the device. In the latter mode, the device and the coordinator firstly negotiate about a specific authentication suite and then perform the authentication process based upon the selected authentication suite, and the coordinator transmits an authenticated status to the device at the end of the authentication process.

A port is an abstract software structure. Input and output data can be controlled by means of port based control. In a layered architecture of a network, respective layers are of strictly unidirectional dependence, and their assigned roles and corporations are embodied centrally over interfaces between the adjacent layers.

A "service" is an abstract concept descriptive of a relationship between the adjacent layers, i.e., a set of operations provided from the respective layers of the network to their immediately upper layers, where the lower layers act as a service provider and the upper layers act as a user requesting for the service. The service is embodied as a primitive, e.g., a system invocation or a library function. The system invocation is a service primitive provided from an operating system kernel to a network application or a high level protocol. A service provided by the $n^{th}$ layer to the $(n+1)^{th}$ layer has to be fuller than that provided by the $(n-1)^{th}$ layer, otherwise presence of the $n^{th}$ layer would be useless.

SUMMARY OF THE INVENTION

An object of the invention is to provide an access method applicable in a wireless personal area network to thereby address the technical problems of low security and low efficiency in the existing access method in a wireless personal area network.

A technical solution according to an embodiment of the invention is as follows.

In an access method applicable in a wireless personal area network, a coordinator broadcasts a beacon frame including a demand for authentication of and an authentication mode of a device, and when the device accesses the personal area network, the method includes the following operations S1 to S4:

S1. determining from the beacon frame whether the coordinator demands for authentication of the device, and if not so, then executing the operation S4; otherwise, executing the operation S2;

S2. authenticating the device in the authentication mode included in the beacon frame;

S3. transmitting, after authentication is passed, by the coordinator to the device an authentication access response including an authenticated status of authenticating the device by the coordinator, and then executing the operation S4; and S4. associating the coordinator and the device.

The authentication mode is direct authentication or authentication based upon an authentication suite.

Authenticating the device in the authentication mode included in the beacon frame includes:

if the authentication mode is direct authentication, then:

transmitting by the device to the coordinator an authentication access request including authentication information of the device requesting for authentication; and judging for authentication of the authentication information in the authentication access request by the coordinator upon reception of the authentication access request from the device.

Authenticating the device in the authentication mode included in the beacon frame includes:

if the authentication mode is authentication based upon an authentication suite, then:

acquiring by the device, from the beacon frame, authentication suites supported by the coordinator, selecting one of the authentication suites and then transmitting an authentication access request to the coordinator; and performing by the coordinator an authentication process with the device based upon the authentication suite selected by the device, upon reception of the authentication access request from the device.

If a key acquired by the coordinator and the device in the authentication process is a primary key, then the authentication process further includes a session key negotiation process at the end of authentication.

The authentication and session key negotiation processes include the following operations 31] to 32]:

operation 31]: defining authentication and session key negotiation transmission primitives at an MAC layer for the device and the coordinator; and operation 32]: encapsulating data of authentication and session key negotiation protocols into an authentication and session key negotiation transmission command frame at the MAC layer for transmission.

The authentication and session key negotiation processes include the following operations 41] to 42]:

operation 41] defining uncontrolled and controlled ports at an MAC layer for the device and the coordinator; and operation 42] encapsulating data of authentication and session key negotiation protocols into a data frame at the MAC layer for transmission via the uncontrolled port.

Associating the coordinator and the device includes:

operation 51] transmitting by the device an association request to the coordinator when the device knows that the coordinator does not demand for authentication of the device; and if there is a session key between the device and the coordinator, then securing by the device the association request using the session key;

operation 52] checking by the coordinator whether the association request is a secured association request upon reception of the association request transmitted from the device, and if not so, then verifying information of the association request directly and then generating an association response; otherwise, de-securing the association request, verifying the information of the association request and then generating an association response;

operation 53] transmitting by the coordinator the association response to the device; and operation 54] checking by the device an association status in the association response upon reception of the association response; and if the association status is SUCCESS, then accessing the wireless personal area network through the coordinator.

The association response includes a network address allocated from the coordinator to the device or a reason of failing to associate.

Associating the coordinator and the device includes:

operation 71] transmitting by the device an association request to the coordinator when the device and the coordinator acquire a session key between the device and the coordinator in the authentication and session key negotiation processes, and securing the association request using the session key;

operation 72] de-securing by the coordinator, upon reception of the association request, the association request, verifying information of the association request and generating an association response secured using the session key between the device and the coordinator;

operation 73] transmitting by the coordinator the association response to the device; and operation 74] checking by the device an association status in the association response upon reception of the association response, and if the association status is SUCCESS, then accessing the wireless personal area network through the coordinator.

The association response includes a network address allocated from the coordinator to the device or a reason of failing to associate.

The invention has the following advantages.

1. The device supports an access to the WPAN in both a non-authentication mode and an authentication mode, the latter of which is based upon authentication between the device and the coordinator, to thereby prevent effectively a DoS attack, thus improving compatibility, security and performance of an access of the device to the WPAN.

2. The association process has not been modified relative to the existing WPAN access method except for the additional authentication access request, authentication and session key negotiation processes and authentication access response prior to the association process; and if the coordinator does not demand for authentication of the device, then the additional processes, i.e., an access process, is performed as in the existing WPAN access method, thereby achieving good compatibility and improving an extendible access of the device to the WPAN.

3. With the support for authentication, the session key used to associate the device and the coordinator may be generated in the authentication process of the device and the coordinator or negotiated using the primary key generated in the authentication process so that the authentication and association processes of the device and the coordinator are well associated, thereby improving a secured access of the device to the WPAN.

4. With the support for authentication, the authentication process between the device and the coordinator can support both direct authentication and authentication based upon an authentication suite to thereby extend a scenario in which the WPAN access method is applied.

5. When authentication and session key negotiation of the device and the coordinator is performed based upon primitive control, authentication and session key negotiation transmission primitives are defined at the MAC layer for both the device and the coordinator, and data of authentication and session key negotiation protocols is encapsulated in an authentication and session key negotiation transmission command frame at the MAC layer for transmission to thereby improve an integrated access of the device to the WPAN so that the authentication and session key negotiation processes can be integrated in hardware.

6. When authentication and session key negotiation of the device and the coordinator is performed based upon port control, uncontrolled and controlled ports are defined for both the device and the coordinator, and until the device accesses the WPAN successfully through the coordinator, the controlled port is disabled and the uncontrolled port allows passage of only the data and management information of the authentication and session key negotiation protocols to thereby perform access control between the device and the coordinator, thus improving a secured access of the device to the WPAN.

DETAILED DESCRIPTION OF THE EMBODIMENTS

Figure 1:
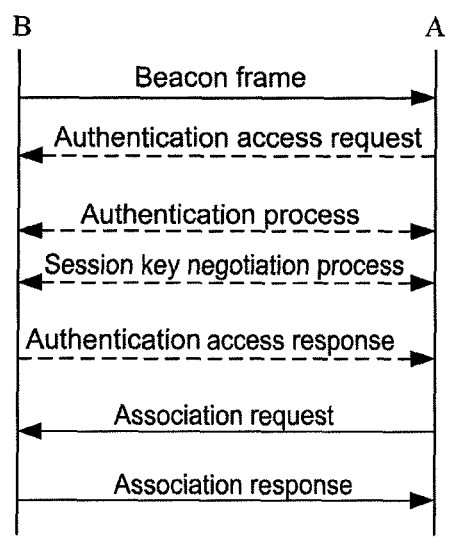
FIG. 1 illustrates a schematic diagram of an access method in a WPAN access system according to an embodiment of the invention.

In a WPAN access system, a device accesses a WPAN through a coordinator in the WPAN, and the coordinator associated with the device decides whether to allow an access of the device to the WPAN during the access. Referring to FIG. 1, "A" represents the device requesting for the access to the WPAN, "B" represents the coordinator associated with "A" in the WPAN, and a solid line represents a process that shall necessarily be performed, and a dotted line represents a process that may optionally be performed. The coordinator (i.e., "B" in FIG. 1) broadcasts a beacon frame, and the device (i.e., "A" in FIG. 1) recognizes from the beacon frame broadcast from the coordinator a demand of the coordinator for authentication of the device. If the coordinator demands no authentication of the device, then the device performs an association process directly with the coordinator; or if the coordinators demands authentication of the device, then firstly authentication and session key negotiation processes and then the association process are performed between the device and the coordinator. The device accesses the WPAN through the coordinator upon successful association to thereby perform normal communication.

Figure 2:
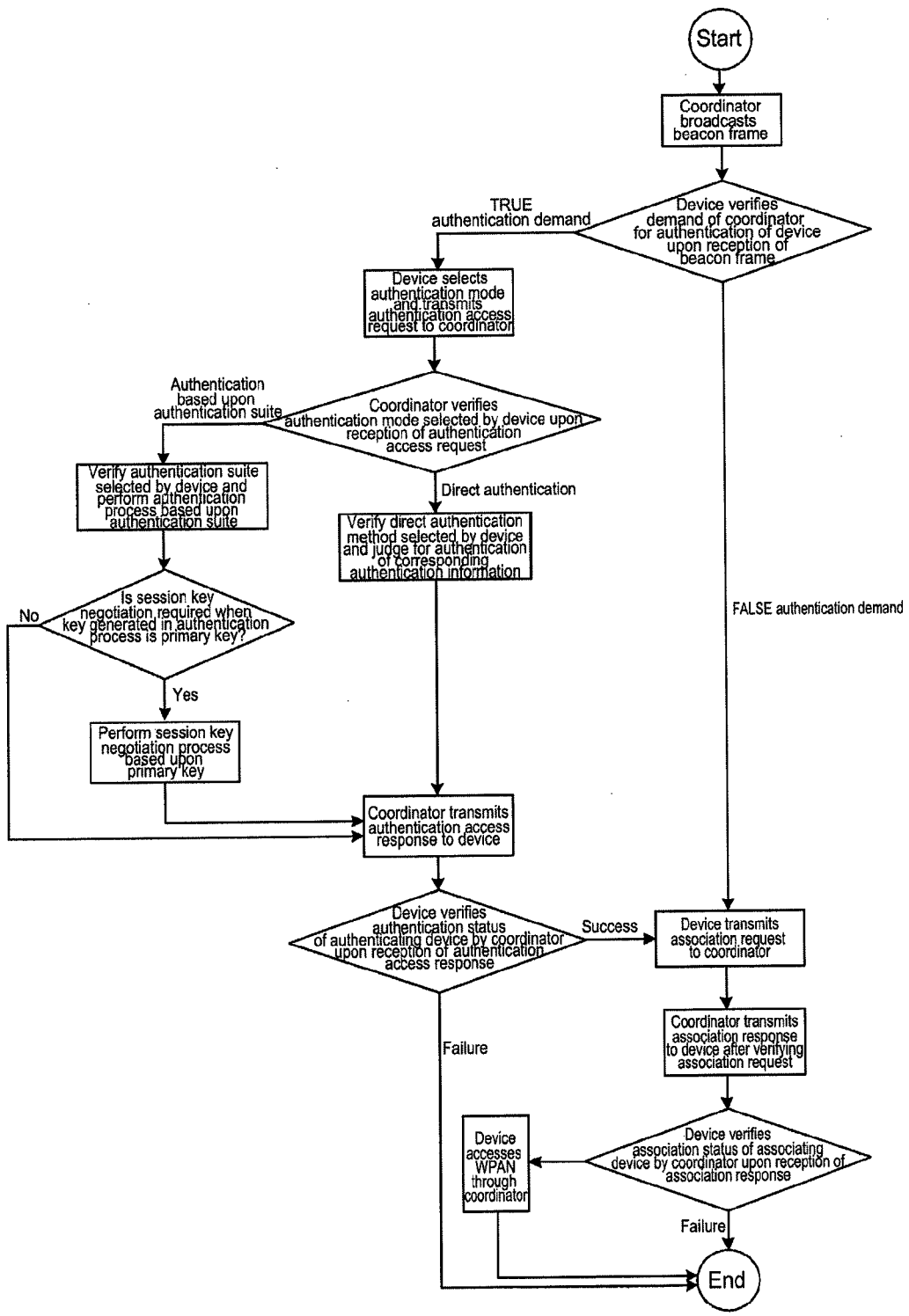
FIG. 2 illustrates a schematic diagram of a flow of an access method in a WPAN access system according to an embodiment of the invention.

As illustrated in FIG. 2, an access method in a WPAN access system is implemented as follows.

Operation 1]: a coordinator broadcasts a beacon frame including a demand for authentication of and an authentication mode of a device.

If the demand of the coordinator for authentication of the device is TRUE, then the beacon frame includes authentication modes supported by the coordinator and corresponding authentication mechanism negotiation information; otherwise, the beacon frame does not includes such information.

The authentication mode includes direct authentication or authentication based upon an authentication suite.

When the authentication mode is direct authentication, the beacon frame includes the information of authentication mechanism negotiation, which indicates direct authentication methods supported by the coordinator, e.g., a password-hash-value based method, an identity identifier based method, etc.

When the authentication mode is authentication based upon an authentication suite, the beacon frame includes the information of authentication mechanism negotiation, which indicates authentication suites supported by the coordinator, e.g., a pre-shared key based authentication suite, an identity (ID)-based authentication suite, etc.

Operation 2]: the device verifies the demand of the coordinator for authentication of the device upon reception of the beacon frame broadcast from the coordinator and when the demand of the coordinator for authentication of the device is FALSE, the authentication process is skipped and the operation 5] is executed directly, or when the demand of the coordinator for authentication of the device is TRUE, firstly the device verifies the authentication modes supported by the coordinator and the corresponding verification mechanism negotiation information and then selects one of the authentication modes and transmits an authentication access request to the coordinator.

When the authentication mode selected by the device is direct authentication, the device shall indicate in the authentication access request that the authentication mode selected by the device is direction authentication as well as one of the direct authentication methods selected by the device and corresponding authentication information.

When the authentication mode selected by the device is authentication based upon an authentication suite, the device shall indicate in the authentication access request that the authentication mode selected by the device is authentication based upon an authentication suite as well as one of the authentication suites selected by the device.

Operation 3]: the coordinator verifies the authentication mode selected by the device upon reception of the authentication access request transmitted in the operation 2] from the device.

When the authentication mode selected by the device is direct authentication, the coordinator firstly verifies the direct authentication method selected by the device and then judges for authentication of the authentication information corresponding to the direct authentication method.

When the authentication mode selected by the device is authentication based upon an authentication suite, the coordinator firstly verifies the authentication suite selected by the device and then performs the authentication process with the device based upon the authentication suite.

If a key generated for the coordinator and the device in the authentication process is a primary key and a session key is required to be generated between the coordinator and the device to secure the association process, then the coordinator and the device shall further perform the session key negotiation process using the primary key.

When the authentication process or the authentication and session key negotiation processes are primitive control based authentication and session key negotiation processes, authentication and session key negotiation transmission primitives are defined at the MAC layer for both the device and the coordinator to carry on authentication and session key negotiation between the device and the coordinator by encapsulating data of authentication and session key negotiation protocols into an authentication and session key negotiation transmission command frame at the MAC layer for transmission.

When the authentication process or the authentication and session key negotiation processes are port control based authentication and session key negotiation processes, uncontrolled and controlled ports are defined for the device and the coordinator, and data transmission primitives and port control at the MAC layer are used to carry on authentication and session key negotiation between the device and the coordinator by encapsulating data of the authentication and session key negotiation protocols into a data frame at the MAC layer for transmission. Particularly, the uncontrolled port allows passage of only the data and management information of the authentication and session key negotiation protocols, and the controlled port allows passage of application service data and is disabled until the device accesses the WPAN successfully through the coordinator.

Operation 4]: the coordinator transmits to the device an authentication access response including an authenticated status of authenticating the device by the coordinator. If the device is authenticated successfully with the coordinator in the authentication process of the operation 3], then the authenticated status is SUCCESS; otherwise, it indicates a failure reason. If the authenticated status is SUCCESS, then the operation 5] is executed; otherwise, the access process is terminated.

Operation 5]: the device transmits an association request to the coordinator. If there is a session key between the device and the coordinator, then the device secures the association request using the session key.

Operation 6]: the coordinator checks whether the association request is a secured association request upon reception of the association request transmitted in the operation 5] from the device.

If the association request transmitted in the operation 5] from the device is a secured association request, then the association request is de-secured, information of the association request is verified and then an association response is generated and transmitted to the device, which is an association response secured by using the session key between the device and the coordinator. Otherwise, the information of the association request is verified directly and then an association response is generated and transmitted to the device, which is an unsecured association response.

If the coordinator allows the access of the device to the WPAN, then the association response includes a network address allocated from the coordinator to the device, and the devices accesses the WPAN successfully through the coordinator so that normal communication can be performed between the device and the coordinator; otherwise, the association response includes a reason of failing to associate the device and the coordinator.

The invention may be described in a general context of computer executable instructions executed by a computer, e.g., a program module, etc. Generally, the program module includes a routine, program, object, component, data structure, etc., to perform a specific task or embody a specific type of abstract data. Alternatively, the invention may be embodied in a distributed computing environment in which the task is performed by a remote processing device connected over a communication network and in which the program module may reside in local and remote computer storage mediums including a storage device.

The foregoing description is merely illustrative of preferred embodiments of the invention, and it shall be noted that those ordinarily skilled in the art may further make several modifications and variations without departing from the principle of the invention and that these modifications and variations shall also be deemed coming into the scope of the invention.

The invention claimed is:

1. An access method applicable in a wireless personal area network, wherein, a coordinator broadcasts a beacon frame comprising a demand for authentication of and an authentication mode of a device, and wherein when the device accesses the wireless personal area network, the method comprises:

determining from the beacon frame that the coordinator demands for authentication of the device, and when the coordinator demands for authentication of the device, executing;

authenticating the device in the authentication mode comprised in the beacon frame;

wherein the authentication mode is direct authentication or authentication based upon an authentication suite, wherein the authentication based upon an authentication suite comprises:

determining the authentication mode comprised in the beacon frame is authentication based upon an authentication suite;

acquiring by the device, from the beacon frame, authentication suites supported by the coordinator, selecting one of the authentication suites and then transmitting an authentication access request to the coordinator; and performing by the coordinator an authentication process with the device based upon the authentication suite selected by the device, upon reception of the authentication access request from the device;

transmitting, after authentication is passed, by the coordinator to the device an authentication access response comprising an authenticated status of authenticating the device by the coordinator;

associating the coordinator and the device and when the coordinator does not demand for authentication of the device, executing:

associating the coordinator and the device.

2. The method of claim 1, wherein, if a key acquired by the coordinator and the device in the authentication process is a primary key, then the authentication process further comprises a session key negotiation process at the end of authentication.

3. The method of claim 2, wherein, the authentication and session key negotiation processes comprise:

defining authentication and session key negotiation transmission primitives at an MAC layer for the device and the coordinator; and encapsulating data of authentication and session key negotiation protocols into an authentication and session key negotiation transmission command frame at the MAC layer for transmission.

4. The method of claim 2, wherein, the authentication and session key negotiation processes comprise:

defining uncontrolled and controlled ports at an MAC layer for the device and the coordinator; and encapsulating data of authentication and session key negotiation protocols into a data frame at the MAC layer for transmission via the uncontrolled port.

5. The method of claim 2, wherein, associating the coordinator and the device comprises:

transmitting by the device an association request to the coordinator when the device and the coordinator acquire a session key between the device and the coordinator in the authentication and session key negotiation processes, and securing the association request using the session key;

de-securing by the coordinator, upon reception of the association request, the association request, verifying information of the association request and generating an association response secured using the session key between the device and the coordinator;

transmitting by the coordinator the association response to the device; and checking by the device an association status in the association response upon reception of the association response, and if the association status is SUCCESS, then accessing the wireless personal area network through the coordinator.

6. The method of claim 5, wherein, the association response comprises a network address allocated from the coordinator to the device or a reason of failing to associate.

7. An access method applicable in a wireless personal area network, wherein, a coordinator broadcasts a beacon frame comprising a demand for authentication of and an authentication mode of a device, and wherein when the device accesses the wireless personal area network, the method comprises:

determining from the beacon frame that the coordinator demands for authentication of the device, and when the coordinator demands for authentication of the device, executing:

authenticating the device in the authentication mode comprised in the beacon frame;

transmitting, after authentication is passed, by the coordinator to the device an authentication access response comprising an authenticated status of authenticating the device by the coordinator; and associating the coordinator and the device; and when the coordinator does not demand for authentication of the device, executing;

associating the coordinator and the device, wherein associating the coordinator and the device comprises:

transmitting by the device an association request to the coordinator when the device knows that the coordinator does not demand for authentication of the device and when there is a session key between the device and the coordinator, securing by the device the association request using the session key;

determining by the coordinator whether the association request is a secured association request upon reception of the association request transmitted from the device;

when the association request is a secured association request, de-securing the association request, verifying information of the association request and generating an association response;

when the association request is not a secured association request, verifying the information of the association request directly and generating the association response;

transmitting by the coordinator the association response to the device; and determining by the device an association status in the association response upon reception of the association response, and when the association status is successful, accessing the wireless personal area network through the coordinator.

8. The method of claim 7, wherein, the association response comprises a network address allocated from the coordinator to the device or a reason of failing to associate.

9. The method of claim 7, wherein, the authentication mode is direct authentication or authentication based upon an authentication suite.

10. The method of claim 9, wherein, authenticating the device in the authentication mode comprised in the beacon frame comprises:

if the authentication mode is direct authentication, then:

transmitting by the device to the coordinator an authentication access request comprising authentication information of the device requesting for authentication; and judging for authentication of the authentication information in the authentication access request, by the coordinator, upon reception of the authentication access request from the device.

11. The method of claim 9, wherein, authenticating the device in the authentication mode comprised in the beacon frame comprises:

if the authentication mode is authentication based upon an authentication suite, then:

acquiring by the device, from the beacon frame, authentication suites supported by the coordinator, selecting one of the authentication suites and then transmitting an authentication access request to the coordinator; and performing by the coordinator an authentication process with the device based upon the authentication suite selected by the device, upon reception of the authentication access request from the device.

12. The method of claim 11, wherein,
the association response comprises a network address allocated from the coordinator to the device or a reason of failing to associate.

13. The method of claim 11, wherein, if a key acquired by the coordinator and the device in the authentication process is a primary key, then the authentication process further comprises a session key negotiation process at the end of authentication.

14. The method of claim 13, wherein,
the authentication and session key negotiation processes comprise:
defining authentication and session key negotiation transmission primitives at an MAC layer for the device and the coordinator; and
encapsulating data of authentication and session key negotiation protocols into an authentication and session key negotiation transmission command frame at the MAC layer for transmission.

15. The method of claim 13, wherein,
the authentication and session key negotiation processes comprise:
defining uncontrolled and controlled ports at an MAC layer for the device and the coordinator; and
encapsulating data of authentication and session key negotiation protocols into a data frame at the MAC layer for transmission via the uncontrolled port.

16. The method of claim 13, wherein,
associating the coordinator and the device comprises:
transmitting by the device an association request to the coordinator when the device and the coordinator acquire a session key between the device and the coordinator in the authentication and session key negotiation processes, and securing the association request using the session key;
de-securing by the coordinator, upon reception of the association request, the association request, verifying information of the association request and generating an association response secured using the session key between the device and the coordinator;
transmitting by the coordinator the association response to the device; and
checking by the device an association status in the association response upon reception of the association response, and if the association status is SUCCESS, then accessing the wireless personal area network through the coordinator.

17. The method of claim 16, wherein,
the association response comprises a network address allocated from the coordinator to the device or a reason of failing to associate.

* * * * *